Feb. 22, 1927.
C. B. WATERS
WELDING TRANSFORMER
Filed Feb. 4, 1924
1,618,497
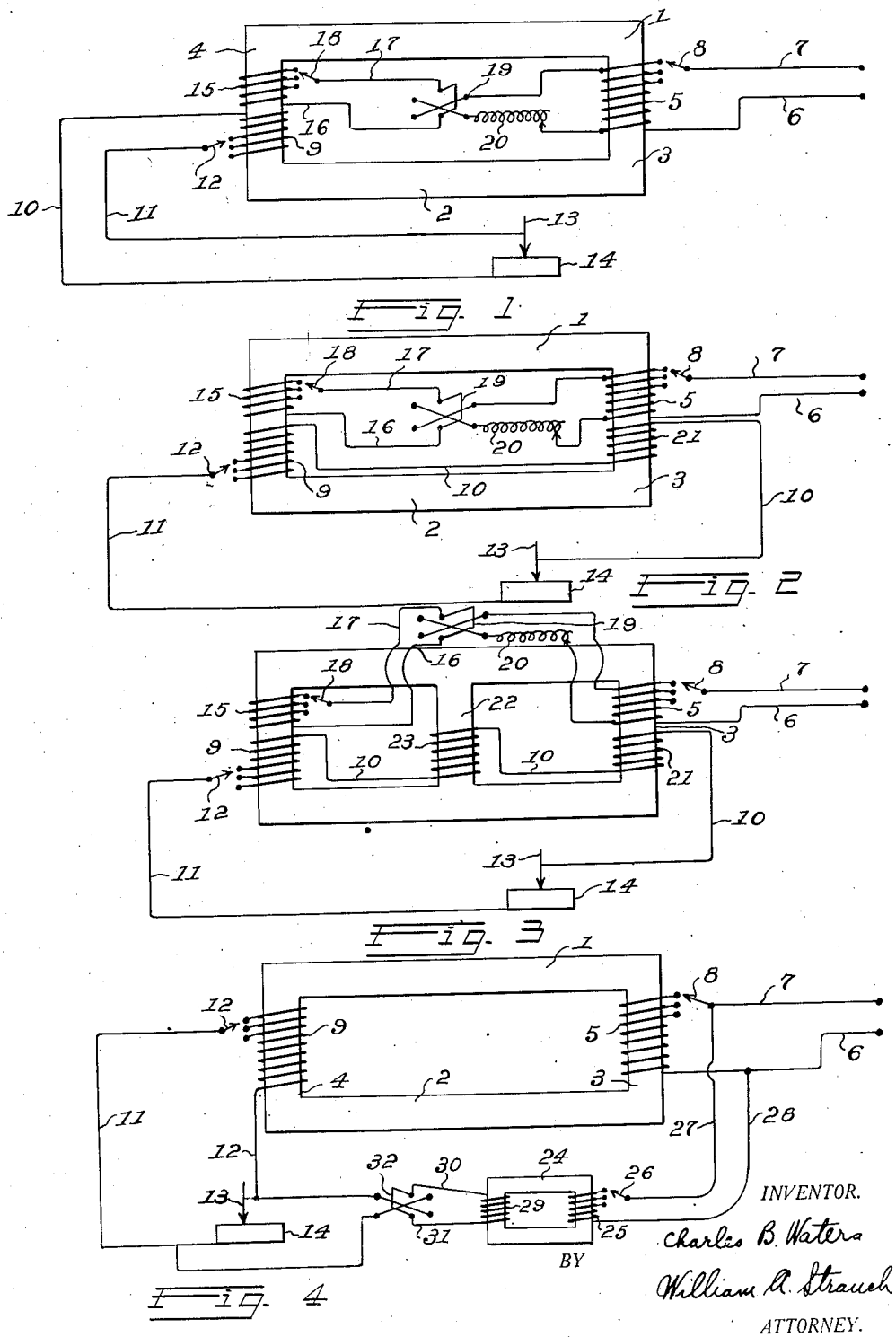
INVENTOR.
Charles B. Waters
BY
William A. Strauch
ATTORNEY.

Patented Feb. 22, 1927.

1,618,497

UNITED STATES PATENT OFFICE.

CHARLES B. WATERS, OF MONTCLAIR, NEW JERSEY.

WELDING TRANSFORMER.

Application filed February 4, 1924. Serial No. 690,489.

The present invention relates to arc welding transformers.

More particularly the invention relates to improvements in welding transformers with exaggerated magnetic leakage whereby greatly improved welding characteristics are attained.

The improvement is in general affected by superimposing on the main secondary voltage and current waves, voltage and current waves which may be varied in magnitude and phase relation with respect to the main secondary waves in accordance with the work to be welded and the personal equation of the operator.

It frequently is desirable to preheat work before welding, or to modify the operation of the welder in a manner to produce a heating effect together with a limited arc welding effect. Such operations as the repairing of scored cylinder walls by depositing metal in the scored parts, for example, can in this manner be successfully and cheaply carried out. Heretofore no arc welder has been produced in which these characteristics may be secured at will.

An object of the present invention is to provide an improved form of arc welding machine for ordinary welding operations.

Another object of the invention is to provide a welder in which the operation may be modified to simply preheat the work, or to produce a limited heating and a limited arc effect, or to produce a full arc effect with substantially no heating of the work except at the arc craters as is usual in ordinary arc welding. Still other objects of the invention will appear in the following disclosure of the preferred embodiments of the invention of which—

Figure 1 is a diagrammatic representation of a form of apparatus in which a split primary winding and a single secondary winding is utilized.

Figure 2 is a diagrammatic representation of an embodiment of the invention in which a transformer with split primary and split secondary windings are utilized.

Figure 3 is a diagrammatic representation of an embodiment of the invention in which a split primary and a split secondary together with an auxiliary secondary winding on magnetic shunt are preferably utilized.

Figure 4 is a diagrammatic representation of an embodiment of the invention in which an auxiliary transformer is utilized.

Referring to Fig. 1 a closed magnetic core comprised of yokes 1 and 2 and legs 3 and 4 is provided. A primary winding 5 is wound upon leg 3 and is connected by means of conductors 6 and 7 and switch 8 to a suitable source of alternating current. A secondary winding 9 is applied on leg 4 and is connected by means of conductors 10 and 11, and switch 12 to a metallic arc welding electrode 13 and a piece of work 14 to be welded. Wound upon leg 4, in close proximity to winding 9, is an auxiliary primary winding 15 which is connected by means of conductors 16 and 17 through switch 18, double pole double throw reversing switch 19 and variable inductance 20, in shunt to the main primary coil 5.

In ordinary arc welding operations the various switches are adjusted to suit the particular requirements of the work to be welded, switch 19 being closed in a manner to add the voltage induced by winding 15 in the winding 9 to the voltage induced in coil 9 by the primary winding 5. The relative phase of the voltages in the secondary is adjusted by means of adjustable reactance 20.

When it is desired to preheat before welding switch 19 is closed in a manner to oppose the voltages induced in coil 9 by windings 5 and 15, and the various switches are adjusted so that no arc will be produced on separation of the electrode from the work. By a proper adjustment of reactance 20, the phase relations may be shifted in a manner to kill the arc entirely. If a modified arc and heating effect is desired, the phase relations and voltage relations may be shifted by adjustment of reactance 20 and the various taps until the modification best suited for the work to be done is attained. It will be seen that a very flexible machine, highly useful for many classes of work is attained, and efficiency of operation not heretofore possible is secured.

In addition to serving as a means for effecting relative phase displacement, reactance 20 serves to limit the current drawn from the primary supply source through winding 15 when the secondary winding 9 is short circuited to start the arc. The effect of the winding 15 is to induce a voltage wave which is sufficient to keep the arc going as the current induced by winding 5 in the secondary goes through zero. Winding 9 performs the function of regulating the arc, and tends to maintain a constant current in the secondary circuit as in the well known Thomson arc transformers. The demands on the regulating action of winding 9 are materially lessened because of the superimposed voltage due to coil 15 in keeping the arc going over the zero current portions of the secondary current waves, and greatly improved welding characteristics result.

In Fig. 2, a form is shown in which the form shown in Fig. 1 is modified by the addition of a winding 21 placed on leg 3 and connected in series in the secondary circuit so that the voltages induced therein will add to the voltages induced in coil 9. The operation is substantially the same as set forth for Fig. 1, like parts having been designated by the same numerals. The action of coil 21 further improves the welding characteristics of the transformer.

In Fig. 3, the invention is shown as applied to an arc welding transformer of the type disclosed in Patent No. 1,464,145, issued August 7, 1923. In this form the modification shown in Fig. 2 is further modified by the addition of a central magnetic shunt leg 22 upon which a winding 23 is applied. Winding 23 acts as an automatic regulator winding and is connected in a manner to add the voltage induced therein to the open circuit secondary voltage. The operation of the machine as described in the above mentioned patent is improved by the action of winding 15 in the manner explained above.

In Fig. 4 a different method of applying the same principle is disclosed. Winding 15 of Fig. 1 is removed and an auxiliary transformer is utilized to produce a similar effect, on the secondary circuit. A core 24 has wound upon one leg thereof an auxiliary primary winding 25 which is connected in shunt to the main primary winding 5 by means of switch 26 and conductors 27 and 28. A winding 29 is applied to the other leg of core 29 and is connected to electrode 13 and work 14 by means of conductors 30 and 31 and double pole double throw reversing switch 32.

In operation the leakage reactance of the main transformer differs materially from the leakage reactance of the auxiliary transformer. The result is that the voltages applied across the arc are out of phase, as is the case in the other forms disclosed. The winding 29 also exerts a regulating influence on the arc as is the case with winding 9. As in the forms above described, the transformer may be used for preheating before the arc is established.

It will be understood that relative phase displacement may be caused by the use of capacity as well as inductance and the term "reactance" in the claims means either or both.

It will be further understood that many modifications of the invention will suggest themselves to those skilled in the art, and that the invention is not limited to the forms disclosed, but is limited in scope by the terms of the appended claims only. Having described preferred embodiments of the invention what is desired to be secured by Letters Patent and claimed as new is:

1. The method of arc welding which comprises the steps of applying the resultant of a plurality of voltages displaced in phase with relation to each other, across an electrode and the work to be welded to establish a welding arc, and varying the phase displacement of the voltages to vary the relative energy consumed in the arc and in the resistance heating effect in the work to be welded whereby preheating of the work to be welded by the resistance heating effect may be effected.

2. The method of preheating and arc welding which comprises the steps of applying a resultant of a plurality of alternating voltages in such phase relation across a metallic electrode and the work to be welded that the electrical energy is to a large extent dissipated in resistance losses at the point to be welded and preheating the work, and after the work is preheated shifting the phase relations of the voltages so that the electrical energy is to a large extent dissipated in maintaining a welding arc between the electrode and the work.

3. A welding circuit comprising a metallic electrode, work to be welded, means for applying the resultant of a plurality of alternating voltages displaced in phase with relation to each other across the electrode and the work, and means for varying the phase angle between said voltages to vary the relative amount of energy dissipated in the arc and in resistance losses.

4. Arc welding apparatus comprising a closed magnetic core; a secondary winding on one part of the core; a plurality of primary windings on said core connected to a common primary source of energy; and a variable inductance interposed between one of said primary windings and said source.

5. The apparatus as set forth in claim 4 together with means for reversing the connections of one of said primary windings to said source.

6. The apparatus as set forth in claim 4 in which the secondary winding comprises a plurality of coils disposed adjacent said primary windings on said core.

Signed at New York city, this 2nd day of February, 1924.

CHARLES B. WATERS.